US010635997B1

(12) United States Patent
Roth et al.

(10) Patent No.: US 10,635,997 B1
(45) Date of Patent: Apr. 28, 2020

(54) FINITE LIFE INSTANCES

(75) Inventors: Gregory B. Roth, Seattle, WA (US); Adam K. Loghry, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 13/525,152

(22) Filed: Jun. 15, 2012

(51) Int. Cl.
*G06Q 10/06* (2012.01)
*G06F 9/455* (2018.01)
*H04L 12/24* (2006.01)
*H04L 29/08* (2006.01)

(52) U.S. Cl.
CPC ............ *G06Q 10/06* (2013.01); *G06F 9/455* (2013.01); *H04L 41/5051* (2013.01); *H04L 67/32* (2013.01); *G06F 2009/4557* (2013.01); *G06F 2009/45575* (2013.01)

(58) Field of Classification Search
CPC . G06Q 10/06; G06F 9/455; G06F 2009/4557; G06F 2009/45575; H04L 41/5051; H04L 67/32
See application file for complete search history.

(56) References Cited

U.S. PATENT DOCUMENTS

| | | | | |
|---|---|---|---|---|
| 6,078,960 A * | 6/2000 | Ballard | | 709/229 |
| 6,141,732 A * | 10/2000 | Adams | | G06F 9/3814 711/137 |
| 6,651,140 B1 * | 11/2003 | Kumar | | G06F 17/30902 707/E17.12 |
| 6,742,033 B1 * | 5/2004 | Smith | | G06F 17/30902 707/E17.12 |
| 7,707,141 B1 * | 4/2010 | Outhred | | G06F 17/30595 707/713 |
| 8,065,676 B1 * | 11/2011 | Sahai | | G06F 9/5077 709/226 |
| 8,239,509 B2 * | 8/2012 | Ferris et al. | | 709/223 |
| 8,433,512 B1 * | 4/2013 | Lopatenko | | G01C 21/3679 701/400 |
| 8,645,745 B2 * | 2/2014 | Barsness et al. | | 714/4.11 |
| 8,935,692 B2 * | 1/2015 | Ferris | | G06F 9/5077 718/1 |
| 8,997,107 B2 * | 3/2015 | Jain | | G06F 9/46 709/223 |
| 2002/0002576 A1 * | 1/2002 | Wollrath et al. | | 709/1 |
| 2003/0041097 A1 * | 2/2003 | Tormasov | | G06F 17/30194 709/201 |

(Continued)

OTHER PUBLICATIONS

Tang, Chunqiang, et al. "A scalable application placement controller for enterprise data centers." Proceedings of the 16th international conference on World Wide Web. ACM, 2007.*

(Continued)

*Primary Examiner* — Asfand M Sheikh
(74) *Attorney, Agent, or Firm* — Davis Wright Tremaine LLP

(57) ABSTRACT

Disclosed are embodiments for creating and provisioning instances having an expiration time. One exemplary embodiment comprises receiving a request to launch at least one instance, the request associated with an expiration time. In response to the request, an an instance can be instantiated using one or more server computers. Further, the embodiment includes determining, based at least in part on the expiration time, to terminate the provisioned instance and subsequently terminating the provisioned instance.

20 Claims, 10 Drawing Sheets

(56) References Cited

U.S. PATENT DOCUMENTS

| | | | |
|---|---|---|---|
| 2005/0120160 A1* | 6/2005 | Plouffe | G06F 9/45537 711/1 |
| 2005/0132364 A1* | 6/2005 | Tewari | G06F 9/5077 718/1 |
| 2007/0143762 A1* | 6/2007 | Arnold | G06F 9/5044 718/103 |
| 2008/0275939 A1* | 11/2008 | Martin | 709/203 |
| 2009/0293056 A1* | 11/2009 | Ferris | G06F 9/5077 718/1 |
| 2010/0023942 A1* | 1/2010 | Sheu | G06F 9/45558 718/1 |
| 2010/0131948 A1* | 5/2010 | Ferris | 718/1 |
| 2011/0154350 A1* | 6/2011 | Doyle | G06F 9/5044 718/104 |
| 2011/0161496 A1* | 6/2011 | Nicklin | 709/226 |
| 2012/0016721 A1* | 1/2012 | Weinman | 705/7.35 |
| 2012/0096461 A1* | 4/2012 | Goswami | G06F 9/45558 718/1 |
| 2012/0137001 A1* | 5/2012 | Ferris | H04W 4/003 709/226 |
| 2013/0152047 A1* | 6/2013 | Moorthi et al. | 717/124 |
| 2013/0275685 A1* | 10/2013 | Barbas | G06F 17/3048 711/137 |
| 2013/0290499 A1* | 10/2013 | Radhakrishnan | G06F 9/505 709/223 |
| 2013/0311988 A1* | 11/2013 | Boss | G06F 9/4862 718/1 |
| 2013/0339776 A1* | 12/2013 | Jagadishprasad | G06F 9/5094 713/340 |

OTHER PUBLICATIONS

Xu, Jing, and Jose AB Fortes. "Multi-objective virtual machine placement in virtualized data center environments." 2010 IEEE/ACM Int'l Conference on Green Computing and Communications & Int'l Conference on Cyber, Physical and Social Computing. IEEE, 2010.*

* cited by examiner

FINITE LIFE INSTANCES

BACKGROUND

Computing resource providers often host computing resources, such as servers, data storage devices, networking devices, and the like, as a service to their customers. Customers can operate some of their computing infrastructure using hardware of the computing resource providers, thereby reducing the amount of upfront investment needed for the infrastructure and often resulting in an overall lower cost to the customer. Customers often are able to configure and reconfigure their infrastructure remotely and programmatically in order to best suit their needs.

In many cases, customers transmit requests to create instances such as, for example, virtual machine instances to execute on hardware devices. Typically, the instances are created with an unbounded lifetime where the instances execute operate for an indefinite time, until some event, such as a system crash or a programmatic reconfiguration causes the instances to terminate. In this way, the amount of time a hardware device is needed to implement a instance can be unpredictable. In addition, single hardware devices are often used to implement multiple system instances. Provisioning the computing system instances and providing maintenance on the computer systems, therefore, presents numerous challenges for effective management of hardware fleets.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may address one or more of the aforementioned and other deficiencies experienced in conventional approaches to manage computer system instances (instances) that execute on implementation resources, such as hardware server computers of a distributed computing environment. Systems and methods in accordance with various embodiments provide approaches for predictably managing fleets of instances through the use of finite life instances. For example, techniques described and suggested herein include an approach for a new type of instance with a defined and/or bounded lifetime. A customer may request that one or more instances may be created with a bounded lifetime. In response, an instance service may create the instances and take one or more actions to terminate the instances at the end of the lifetime.

A placement service may then provision the instances on a set of server computers of the distributed computing environment. For example, the placement service may select a server computer to implement the instances based at least in part on the lifetime indicated by the user. Additionally, the placement server may select a server computer to implement the instances based at least in part on the lifetimes of the previously provisioned instances associated with the server computer. Therefore, the fleets of instances on the implementation resources of the distributed computing environment will have a predictable lifetime that allows for scheduling maintenance and software updates.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
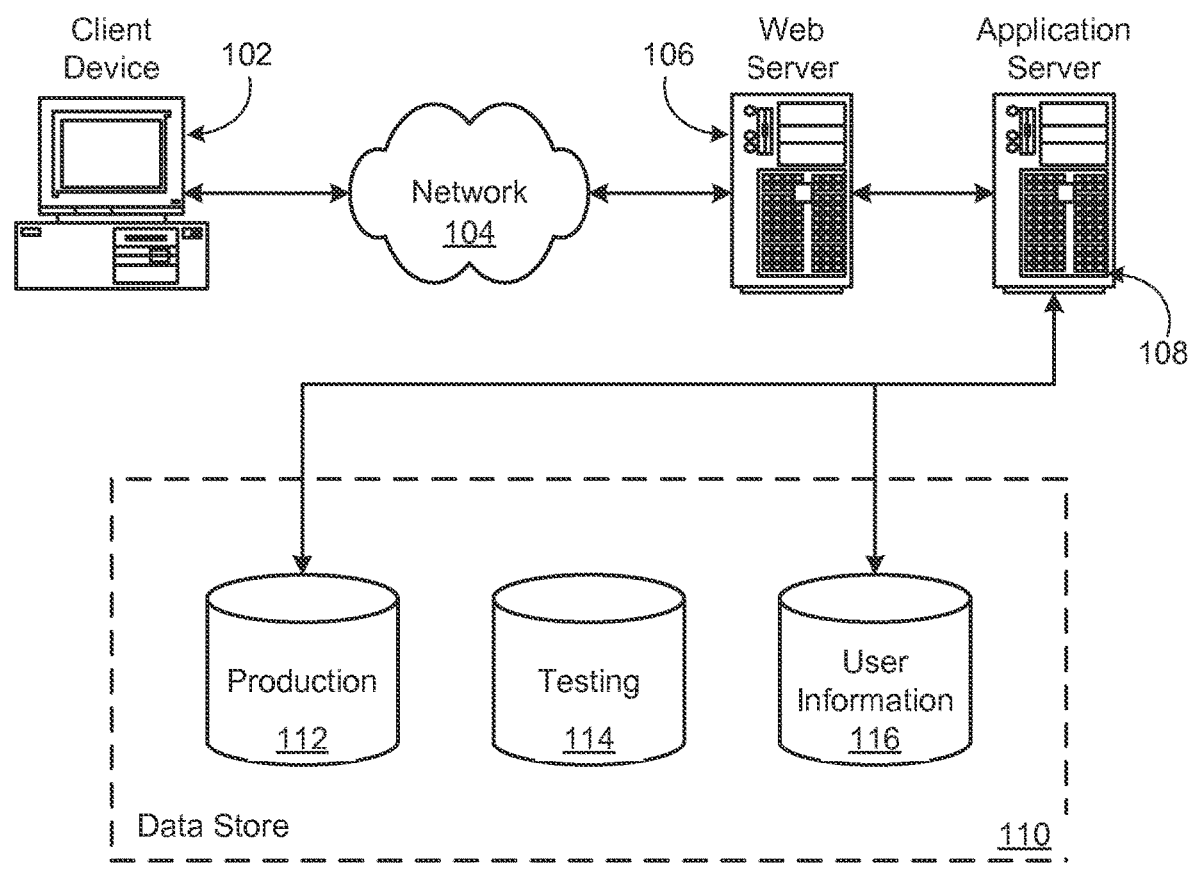
FIG. 1 illustrates an environment in which various embodiments can be implemented.

FIG. 1 illustrates aspects of an example environment 100 for implementing aspects in accordance with various embodiments. As will be appreciated, although a Web-based environment is used for purposes of explanation, different environments may be used, as appropriate, to implement various embodiments. The environment includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network 104 can include any appropriate network, including an intranet, the Internet, a cellular network, a local area network, or any other such network or combination thereof. Components used for such a system can depend at least in part upon the type of network and/or environment selected. Protocols and components for communicating via such a network 104 are well known and will not be discussed herein in detail. Communication over the network 104 can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server 108 can include any appropriate hardware and software for integrating with the data store 110 as needed to execute aspects of one or more applications for the client device 102, handling a majority of the data access and business logic for an application. The application server 108 provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server 106. It should be understood that the Web server 106 and the application server 108 are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used for reporting, analysis, or other such purposes. It should be understood that there can be many other aspects that may need to be stored in the data store 110, such as for page image information and to access rights information, which can be stored in any of the above listed mechanisms as appropriate or in additional mechanisms in the data store 110. The data store 110 is operable, through logic associated therewith, to receive instructions from the application server 108 and obtain, update, or otherwise process data in response thereto. In one example, a user might submit a search request for a certain type of item. In this case, the data store 110 might access the user information to verify the identity of the user, and can access the catalog detail information to obtain information about items of that type. The information then can be returned to the user, such as in a results listing on a Web page that the user is able to view via a browser on the client device 102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the environment 100 in FIG. 1 should be taken as being illustrative in nature, and not limiting to the scope of the disclosure.

The environment such as that illustrated in FIG. 1 may be useful for a provider such as a distributed computing resource provider, wherein a distributed computing resource system responds to requests from customers to provide instances. As discussed above, however, the distributed computing resource system may provide instances with a finite lifetime. The electronic environment in such a case may include additional components and/or other arrangements, such as those illustrated in the networked environment 200 of FIG. 2a. In this example, the networked environment 200 includes a distributed computing resource system 203 in data communication with a client device 206 and server computers 209 over a network 213. In one embodiment, the server computers 209 may be one or more computer hardware devices that are used to implement instances 216. For example, the server computers 209 may include hardware for implementing types of computing resources, such as storage devices, virtualized storage devices, networking devices, and the like. Additionally, the implemented computing resources may be programmatically and remotely managed by a customer of the distributed computing resource provider.

The server computers 209 includes a plurality of computer system device that are each capable of executing one or more instances 216 created by the distributed computing resource system 203. In one embodiment, each of the server computers 209 include a processor, a data store, an input/output bus, and/or any other component known in the art for executing instances 216. Additionally, the instances 216 may be virtual machine instances. As known in the art, a virtual machine instance is an instance of a software implementation on a machine (i.e., a computer) that executes programs like a physical machine. For example, each of the server computers 209 may be configured to execute an instance manager 217 capable of implementing the instances 216. The instance manager 217 may be a hypervisor or another type of program configured to enable the execution of multiple instances 216 on a single server computer 209, for example. As discussed above, each of the instances 216 may be configured to execute all or a portion of an application. Additionally, the network 213 may be similar to the network 104 (FIG. 1) as described above. The networked environment 200 may span one or more data centers, where each data center may be geographically distinct from each other. Additionally, the networked environment 200 shown in FIG. 2a may be one of several embodiments employed by the distributed computing resource provider.

In one embodiment, the distributed computing resource system 203 includes a data store containing resource data 219, an instance service 223, a placement service 226, an scaling service 229, a maintenance service 233, and/or other components. The resource data 219 may include data related to the server computers 209. For example, in one embodiment, the resource data 219 includes one or more records of server computer data 246. Each one of the records of the server computer data 246 corresponds to the server computers 209 of the networked environment 200.

The instance service 223 instantiates instances 216 based at least in part on a set of preferences provided by the customer. In one embodiment, the instance service 223 receives, from the customer on the client device 206, a request 236 to create one or more instances 216 having a bounded lifetime. Additionally, the request 236 received from the customer on the client device 206 may also indicate a time to start execution of the requested instances 216. In response to receiving the request, the instance service 223 instantiates instances 216 that are configured to automatically terminate after the indicated duration 239. In one embodiment, the instance service 223 may terminate the instances 216 after the indicated lifetime. For example, the instance service 223 may monitor the time of existence of the instances 216 and terminate the instances 216 when the life of the instance 216 corresponds to the indicated bounded lifetime by sending a signal to an instance manager, which in turn can terminate the instance.

The placement service 226 provisions the instances 216 to one or more of the server computers 209. In one embodiment, the placement service 226 determines the server computers 209 to provision the new instances 216 based at least in part on the indicated lifetime and/or the time to start the implementation of the new instances 216. For example, the placement service 226 may identify one or more server computers 209 with the appropriate capacity to execute the instances 216 for a length of time indicated by the lifetime and beginning at a time indicated by the start time. To this end, the placement service 226 determines the capacity of each server computer 209 from the resource data 219 stored in the data store and accordingly provisions the instances 216, as will be described.

The scaling service 229 automatically scales the capacity of a collection of previously requested instances 216 up or down based at least in part on circumstances defined by the customer that requested the instances 216. For example, the scaling service 229 may decrease the number of instances 216 allocated to the customer during demand lulls and increase the number of instances 216 allocated to the customer during demand peaks. In one embodiment, the scaling service 229 sheds a subset of the requested instances 216 during a period of low usage and/or idle time. For example, the scaling service 229 may determine that the amount of instances 216 requested by the customer is redundant and/or excessive. In response, the scaling service 229 may terminate a certain number of instances 216 allocated to the customer such that the remaining number of instances 216 allocated to the customer is not redundant and/or excessive. In another embodiment, the scaling service 229 may shed the subset of the requested instances 216 if the usage rate does not exceed a predetermined threshold. Similarly, the scaling service 229 increases the amount of instances 216 during a period of high usage. In one embodiment, the scaling service 229 may increase the amount of instances 216 if the usage rate exceeds a predetermined threshold.

The maintenance service 233 schedules maintenance, software updates, and/or firmware updates for the server computers 209. In one embodiment, the maintenance service 233 schedules the maintenance and software updates at an appropriate time based at least in part on the available capacity of the server computers 209. For example, the maintenance service 233 may schedule the maintenance and software updates at a time when the respective server computer 209 has a projected availability. In one embodiment, the maintenance service 233 may patch and restart the server computers 209 when the maintenance service 233 determines that the server computer 209 is not hosting any instances 216. Additionally, the maintenance service 233 may patch virtual machines associated with the instance 216 if necessary prior to instantiating new images that are associated with the respective virtual machines. For example, the maintenance service 233 may schedule a patch of the machine image based at least in part on a start time of the instances 216, and/or the expected lifetime of the instances 216 currently being implemented on the server computers 209. In one embodiment, no additional instances may be provisioned on the server computer 209 until the scheduled maintenance is completed. In another embodiment, additional instances may be provisioned on the server computer 209 if the lifetime of the additional instances correspond to the amount of time remaining until the scheduled maintenance and/or if the lifetime is less than the amount of time remaining.

Figure 2A:
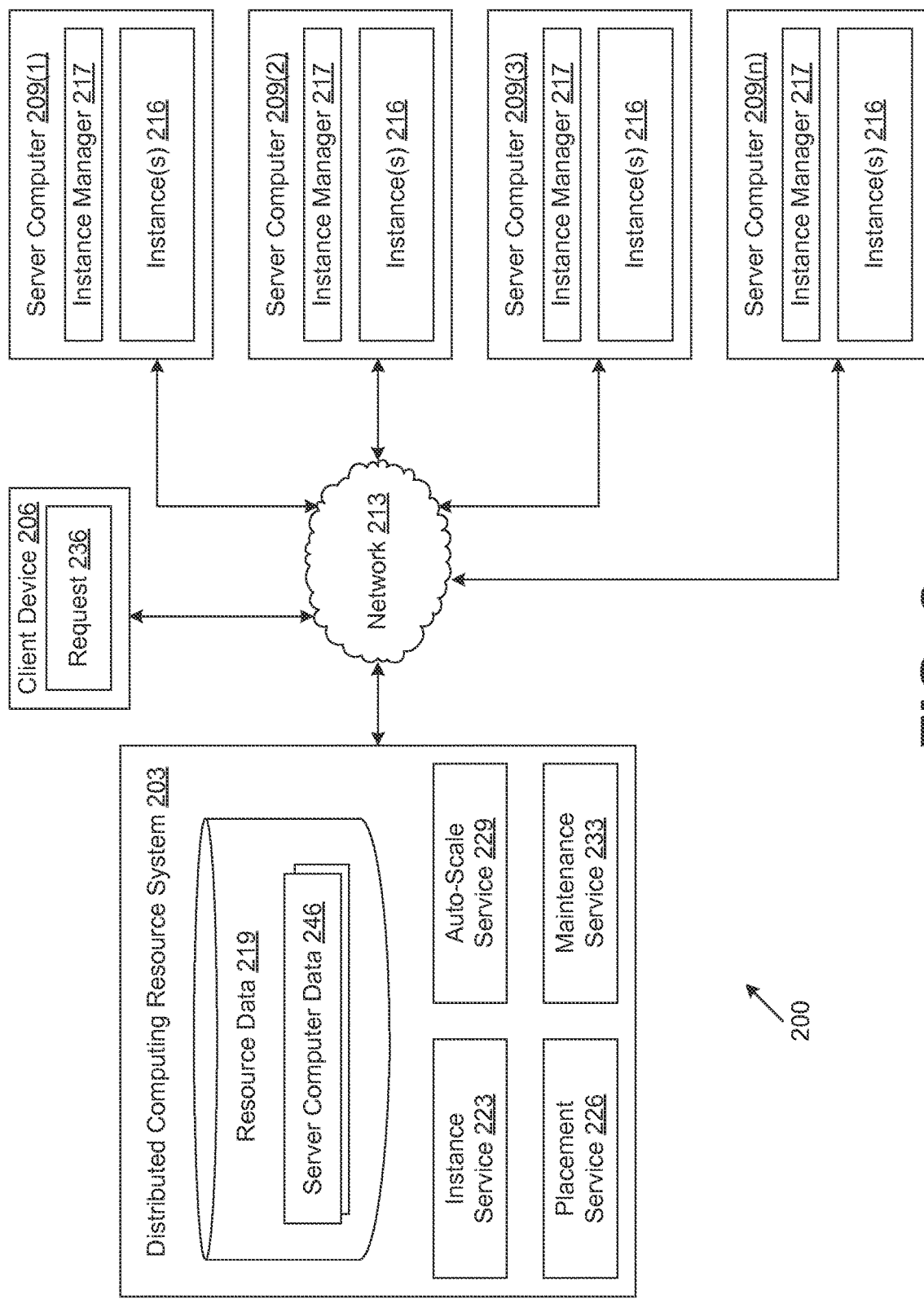
FIG. 2a illustrates a system for instantiating bounded instances and provisioning the instances to a set of implementation resources.
Figure 2B:
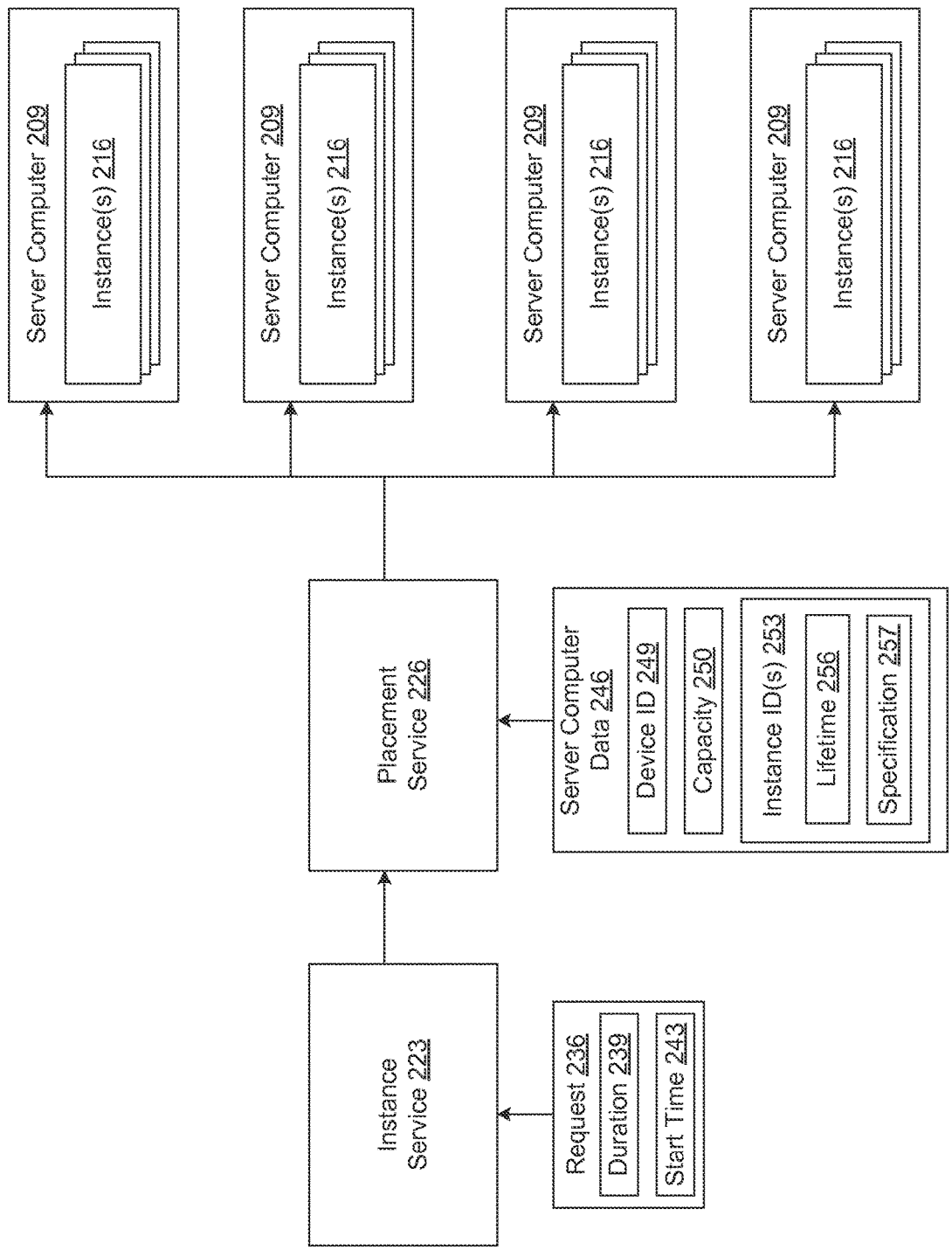
FIG. 2b illustrates components for instantiating instances with an expiration and provisioning the instances.

FIG. 2b is a computing system diagram showing aspects of several software components disclosed herein for instantiating instances having a finite lifetime. As previously discussed, the distributed computing resource system 203 includes an instance service 223 and a placement service 226. As also discussed above, the instance service 223 receives a request 236 to instantiate a at least one instance from a user on a client device 206 (FIG. 2a) where the request 236 may indicate a duration 239 that corresponds to a desired lifetime of the instances 216. Additionally, the request 236 may also indicate a start time 243 that corresponds to a desired time to start the implementation of the instances 216. In this regard, the distributed computing resource system 203 may provide a Web interface through which aspects of its operation may be configured through the use of a Web browser application program executing on the client device 206. Alternatively, a stand-alone application program executing on the client device 206 might access an application programming interface ("API") served up by the distributed computing resource system 203 for performing the operations disclosed herein.

Additionally, as previously discussed, the placement service 226 provisions the new instances 216 to one or more server computers 209 based on information available in the server computer data 246. The server computer data 246 stores a record of information for each server computer 209 in communication with the distributed computing resource system 203. For example, each server computer 209 may have a unique device ID 249 such as a unique alphanumeric identifier, and/or another unique character string that uniquely identifies the server computer 209. Additionally, each one of the records of the server computer data 246 may also include a capacity 250 listing the hardware specifications of the corresponding server computer 209. For example, the capacity 250 may include a total amount of available memory, a total number of virtual computation units, a total amount of data storage, a type(s) of encryption, a bus speed, and/or any other type of hardware specification, as can be appreciated. Each server computer 209 may be associated with a resource unit value that corresponds to an amount of resources allocated to the server computer 209. The virtual computation unit may, for example, be an abstraction of a set of computer resources and therefore, represent a certain amount of processor usage, a processor speed, an amount of RAM, and other characteristics of a hardware computing device's resources that are allocated to the server computer 209. It should be noted that the computer resources may not be exclusively allocated to the server computer 209. In one embodiment, the computer resources may be allocated, such that, for example, over a period of time, the server computer 209 has at least the corresponding amounts of computer resources available to it.

Additionally, the server computer data 246 includes a listing of instance IDs 253, each of which may be unique. As discussed above, each server computer 209 may host one or more instances 216 at any given time. The listing of instance IDs 253 includes a unique identifier for each one of the instances 216 being hosted by and/or previously provisioned on the server computer 209 (with the device ID 249). Included in the listing of instance IDs 253 are a lifetime 256 and a specification 257 for each of the instances 216 of the listing. In one embodiment, the lifetime 256 may be represented by an amount of time remaining in the life of the instance 216, a time at which the instance 216 is scheduled to be terminated, a time indicating a duration 239 of the instance 216 that may have been established during creation of the instance 216, and/or other information that corresponds to the lifetime 256 of the instance 216. The specification 257 represents the amount of hardware resources associated with the instance 216. For example, the specification 257 may include the amount of memory, the number of virtual computation units, the amount of data storage, and/or other resources requested by the user for executing the instance 216.

A user on the client device 206 transmits a request to create the instances 216 by manipulating one or more network pages rendered on a display associated with the client device 206 and/or by invoking an API. For example, the user may indicate, via the one or more network pages and/or an API call, a desired duration 239 for the instances 216. In one embodiment, the user may indicate the duration 239 by specifying a length of time for which the instances 216 should exist, a time in the future when the instances 216 should be terminated, and/or another manner for indicating the duration 239 of the instances 216. Additionally, the user may indicate, via the one or more network pages and/or an API call, a start time 243 for creating the instances 216. In one embodiment, the user may individually indicate a start time 243 for each one of the instances 216. For example, the user may indicate the start time 243 or a start time for each instance by specifying a length of time to wait before creating each of the instances 216, a time or times in the future when the instances 216 should be created, and/or another manner for indicating the start time 243. Additionally, the user may adjust the duration 239 of the requested instances 216 once the instances 216 have already been instantiated by the instance service 223. In one embodiment, the user may indicate, via the one or more network pages and/or an API call, that the duration 239 of an instance 216 previously instantiated and being currently implemented by one or more server computers 209 be prolonged and/or shortened. Similarly, the user may adjust the start time 243 of a previously requested instance 216 via the one or more network pages and/or an API call.

In one embodiment, the user may also provide specifications for the instances 216 to be created. For example, the user may indicate, via the one or more network pages and/or an API call, an amount of memory, a number of virtual processing cores and/or virtual computation units, an amount for data storage, an encryption standard, a bus speed, and/or any other specification for instances 216 as conventional in the art. Additionally, the user may create one or more machine images for the instances 216 that include applications, libraries, data, configuration settings, and/or other information to be executed by the instances 216. The user may also indicate an operating system for each machine image. In one embodiment, the user may create a different machine image for each one of the requested instances 216.

The request 236 from the user on the client device 206 is transmitted over the network 213 to the distributed computing resource system 203. The instance service 223 receives the request 236 transmitted by the user on the client device 206. In response, the instance service 223 instantiates the requested instances 216 according to the user preferences. For example, the instance service 223 creates a machine image that includes the applications, libraries, data and configuration settings provided by the user and specifies the operating system in which to execute the instance 216, as indicated by the user. Additionally, the instance service 223 pairs the machine image with the instantiated instances 216 and configures the instances 216 to automatically terminate at a time corresponding to the duration 239. For example, the duration 239 may be a length of time for which the instances 216 should exist and/or a time in the future at which the instances 216 should be terminated, as discussed above. In another embodiment, the instance service 223 may instantiate instances 216 that are manually terminated. In this embodiment, the instance service 223 may store the duration 239 as the lifetime 256 in the listing of instance IDs 253 associated with the instantiated instance 216. The instance service 223 may then monitor and terminate the instances 216 when the lifetime 256 for the each instance expires, as can be appreciated. In one embodiment, the instances 216 being terminated may instead be retained if the resources implementing the instances 216 have spare capacity. For example, the user may have requested to restart at a later time the instances 216 being terminated. In this example, the instances 216 may be retained for the restart. Upon termination, the resources of the server computer 209 used to implement the instances 216 may be recovered for implementing other instances 216.

Having created the instances 216, the placement service 226 provisions the instances 216 instantiated by the instance service 223 on a one or more server computers 209. To this end, the placement service 226 determines the availability of each server computer 209 from the server computer data 246 associated with the server computers 209. In one embodiment, the placement service 226 identifies the previously provisioned instances 216 for each server computer 209 from the listing of instances IDs 253 stored in the server computer data 246. For example, each of the previously provisioned instances 216 may be identified by the unique instance ID 253. The placement service 226 then identifies the remaining lifetime 256 of the previously provisioned instances 216 on each of the server computers 209. In one embodiment, the lifetime 256 may be represented by a time in the future when the corresponding instance 216 is scheduled to terminate. In another embodiment, the lifetime 256 may be represented by an amount of time remaining until the corresponding instance 216 terminates.

Having identified the lifetime 256 for the previously provisioned instance 216, the placement service 226 then determines an amount of resources dedicated to the implementation of the previously provisioned instances 216. In one embodiment, the placement service 226 identifies the specification 257 associated with each of the previously provisioned instances 216. For example, the specification 257 may indicate an amount of memory, number of computing units, amount of data storage, and/or other resources of the server computer 209 already committed towards the implementation of the previously provisioned instances 216. From the specification 257 and the lifetime 256 associated with each of the previously provisioned instances 216 of the server computer 209, the placement service 226 determines the availability of the server computer 209 to host the new instances 216 instantiated by the instance service 223. In one embodiment, the placement service 226 determines an amount of resources of the server computer 209 previously committed for the implementation of the previously provisioned instances 216. For example, the placement service 226 aggregates the amount of resources indicated by the specification 257 of each one of the previously provisioned instances 216 and compares the aggregated specifications 257 with the capacity 250 of the server computer 209. If a sufficient capacity 250 of the server computer 209 remains for hosting the new instances 216, the placement service 226 may provision the new instances 216 to the server computer 209.

The placement service 226 may also determine whether a sufficient capacity 250 of the server computer 209 is available for the duration 239 indicated by the user before provisioning the new instances 216 to the server computer 209. For example, one or more of the previously provisioned instances 216 may be scheduled to execute at some time in the future. As such, an amount of the capacity 250 currently available may already be committed towards the execution of the previously provisioned instances 216. In this example, the placement service 226 determines whether the capacity 250 currently available remains available throughout the duration 239 of the new instances 216.

The placement service 226 may also determine whether a sufficient capacity 250 of the server computer 209 will become available at the start time 243 indicated by the user before provisioning the new instances 216 to the server computer 209. For example, the server computer 209 may lack sufficient capacity 250 at the current time. However, the previously provisioned instances 216 currently being executed by the server computer 209 may terminate before the start time 243 indicated by the user. In this embodiment, the placement service 226 determines whether a server computer 209 has sufficient capacity 250 to execute the new instances 216 starting from a time in the future that corresponds to the start time 243. To this end, the placement service 226 identifies the lifetimes 256 for the each of the previously provisioned instances 216 that are currently being executed by the server computer 209. If the lifetimes 256 indicate that the previously provisioned instances 216 will terminate prior to the start time 243 of the new instances 216, the placement service 226 determines that the available capacity 250 of the server computer 209 increases prior to the start time 243 of the new instances 216. If the increased capacity 250 is sufficient to execute the new instances 216 at a time corresponding to the start time 243, the placement service 226 may provision the new instances 216 to the server computer 209.

Additionally, the placement service 226 may determine the available capacity 250 of each one of the server computers 209 before provisioning the new instances 216. In one embodiment, the placement service 226 may identify which server computers 209 are the most appropriate to be provisioned the new instances 216. For example, the placement service 226 may identify multiple server computers 209 that have available capacity 250 to execute the new instances 216. However, some of the server computers 209 may have more available capacity 250 than the other identified server computers 209. Thus, the placement service 226 may provision the new instances 216 to underutilized server computers 209. In another embodiment, the placement service 226 may also determine whether other instances 216 are being simultaneously provisioned on the identified server computers 209. If other instances 216 are being simultaneously provisioned on the identified server computers 209, the placement server 226 may identify another set of server computers 209 on which to provision the new instances 216 to avoid over taxation of the server computers 209 and/or other computers involved caused, at least in part, by concurrent provisioning of instances on common hardware.

Using this approach, the placement service 226 may distribute the instances 216 in a more uniform manner across the server computers 209.

The placement service 226 may also oversubscribe the server computers 209 with instances 216. In one embodiment, a portion of the resources on a server computer 209 reserved for a previously provisioned instance 216 may only be used on a periodic basis by the respective instance 216. For example, the placement service 226 may determine the periodicity based on historical data and/or a projected data. In this embodiment, the placement service 226 may provision new instances 216 such that the resources of the server computer 209 reserved for the previously provisioned instance 216 are also reserved for the new instances 216. For example, if a period of projected inactivity for the resources of the server computer 209 correspond to the duration 239 of the new instance 216, the placement service 226 may provision the new instance 216 to the respective server computer 209.

The placement service 226 may also determine the availability of each server computer 209 based at least in part on the available slots associated with each server computer 209. For example, each server computer 209 may be associated with a predetermined number of slots where each slot is configured to implement one instance 216 of a predetermined size. The placement service 226 may identify a number of available slots for each of the server computers 209 and accordingly provision the new instances 216. In one embodiment, the placement service 226 may provision the requested new instances 216 such that the instances 216 are distributed across more than one server computers 209 based at least in part on the slot availability. Additionally, the placement service 226 may distribute the instances 216 in a uniform manner such a server computer 209 is not overburdened, as described above.

In provisioning the instances 216, the placement service 226 may ensure diversity in the software being executed on the server computers 209. In one embodiment, the placement service 226 may determine the version of the software used for implementing the instance 216 previously provisioned to a server computer 209 and provision the new instances 216 to be implemented with a different version of the software. Accordingly, the placement service 226 may reduce system failures related to software versioning.

The instance service 223 may, according to certain embodiments, invoke the scaling service 229 if the user requests that new instances 216 be created in the future at the indicated start time 243. As discussed above, the scaling service 229 automatically sheds and/or expands the number of instances 216 based at least in part on a set of circumstances. The request 236 received from the user on the client device 206 may indicate that a portion of the requested instances 216 be created in the future at a time that corresponds to the start time 243. Accordingly, the instance service 223 instantiates a subset of the instances 216 requested to be created instantly. Then, at a future time that corresponds to the start time 243, the scaling service 229 may expand the previously instantiated subset of instances 216 to create the remaining instances 216, as indicated by the request 236.

Additionally, the user may also request that a subset of the requested number of instances 216 be restarted at a time after the duration 239. For example, the user may request that one or more of the instances 216 with a bounded lifetime be restarted periodically upon termination. The user may indicate the periodicity based at least in part on various information such as, for example, a predicted demand, a predicted lull, and/or other information. In this example, the instance service 223 may invoke the scaling service 229 to restart the previously terminated instances 216. In one embodiment, the instance service 223 may store a restart time in association with the instance ID 253 in the data store and invoke the scaling service 229 to restart the instance 216 at a time that corresponds to the restart time. Additionally, the scaling service 229 may invoke the placement service 226 to provision the restarted instance 216 to an appropriate server computer 209, as described above.

The placement service 226 may pre-cache instances 216 that are scheduled to be started and/or restarted at a known time in the server computer 209 provisioned to by the placement service 226. In one embodiment, the placement service 226 may pre-cache the instance 216 about to be implemented to decrease the latency period related to starting and/or restarting the instances 216. For example, the placement service 226 may pre-cache the instance 216 a threshold amount of time prior to the scheduled start time and/or restart time to overcome the latency period. Additionally, the placement service 226 may also pre-cache new instances 216 that have been provisioned to the server computer 209 based at least in part on an expected termination of a currently running instance 216. For example, the placement service 226 may determine that a currently running instance 216 is nearing termination based at least in part on the lifetime 256 associated with the currently running instance 216. The placement service 226 may pre-cache the new instance 216 provisioned to the server computer 209 a threshold amount of time before the lifetime 256 of the currently running instance 216 expires. Thus, the new instance 216 may start immediately after the termination of the previously running instance 216, thereby overcoming any start time latency.

As discussed above, the instance service 223 may manually terminate instances 216 according to the indicated duration 239. In one embodiment, new instances 216 may be instantiated following the termination of the old instances 216 that take the place of the terminated instances 216. For example, the placement service 226 may provision the new instances 216 to the same server computer 209 that implemented the terminated instances 216. In this embodiment, the instance service 223 may pre-push DNS changes in anticipation of the new instances 216 being provisioned. For instance, the instance service 223 may associate the new instances 216 with a DNS name and/or DNS identifier prior to the new instance 216 being provisioned to the server computer 209. Accordingly, the instance service 223 may account for a latency period for associating the new instances 216 with a DNS identifier by pre-pushing the DNS changes.

In the embodiments described above, the instance service 223 may launch new instances 216 on a rolling basis upon receipt of the request from the customer. For example, the instance service 223 may instantiate the new instances 216 instantly or take one or more actions to instantiate the new instances 216 at a time in the future indicated by the start time 243. Additionally, the instance service 223 may terminate the instantiated instances 216 on a rolling basis according the duration 239 of the instances 216, as indicated by the customer. Upon each launch and/or termination by the instance service 223, the placement service 226 may provision the new instances 216 and/or the remaining instances 216 on a rolling basis. Therefore, the distributed computing resource system 203 may be simultaneously launching, terminating, and/or provisioning instances 216 on a rolling basis.

In yet another embodiment, the placement service 226 may provision the new instances 216 on a server computer 209 such that the expiration of the new instances 216 corresponds to the expiration of the previously provisioned instances 216 on the server computer 209. In this embodiment, the instances 216 server computer 209 may all be scheduled to expire at approximately a similar time thereby allowing for the maintenance service 133 to schedule maintenance on the respective server computer 209 at a predictable time when all of the instances 216 provisioned on the server computer 209 expire.

The maintenance service 233 may also trigger migration of the instances 216 to patch the server computers 209. In one embodiment, the maintenance service 233 may invoke the placement service 226 to migrate instances 216 from one server computer 209 to another server computer 209 in order to reboot the server computer 209. The placement service 226 may re-provision the instances 216 that were previously provisioned to the server computer 209 needing the patch on another server computer 209, according to the approach described herein. In one embodiment, the placement service 226 may live migrate the instances 216 being executed to another server computer 209 by re-provisioning the instances 216. For example, a persistence indicator may be associated with each one of the instances 216 that indicates whether to restart the instance 216 upon migration or to retain the state of the instance 216 during the migration. The placement service 226 may retain the state of the instance 216 being migrated based at least in part on the persistent state.

Upon provisioning the requested instances 216 and/or prior to provisioning the requested instances, the user on the client device 206 may receive an accounting record that includes an invoice for the creation of the instances 216 according to the user preferences. In one embodiment, the invoice may be generated based at least in part on the hardware specifications indicated by the user, the duration 239, the start time 243, and/or other factors indicated by the request 236. Additionally, one or more discounts may be presented in the invoice based at least in part on the duration 239 and the start time 243. For example, a discount may be available if the start time 243 corresponds to a period of low activity in the server computer 209. A discount may be available if the span of the duration 239 corresponds to a lull and/or a projected lull in the amount of activity of the server computers 209. For example, if the server computers 209 are historically under utilized during a period of time, a discount may be available if the start time 243 corresponds to the period of under utilization. Similarly, a premium rate may be associated with the invoice if the start time 243 and/or the duration 239 correspond to a peak and/or a projected peak period of activity of the server computers 209. In one embodiment, the projected lulls and projected peaks in activity may be determined from historical data. In another embodiment, the projected lulls and projected peaks in activity may be determined based on the lifetimes 256 of the instances 216 currently being hosted by the server computers 209, as will be discussed. Further, a premium may be associated with the invoice in the event that the user requests that the duration 239 and/or the start time 243 be adjusted for a previously requested instance 216. For example, the premium for adjusting the duration 239 and/or the start time 243 may raise the price such that it is more expensive than if the user had initially requested the instances be created for the adjusted duration 239 and/or the adjusted start time 243. In a further embodiment, a premium may be associated with the invoice in the event that the user requests that the instances be started and terminated on a periodic basis and/or a discount may be given in exchange for customer allowance of a certain number of starts and restarts of the instances.

Additionally, the invoice may be transmitted to the user on the client device 206 after the placement service 226 provisions the requested instances 216, as will be described. In another embodiment, the placement service 226 may determine the server computer 209 or server computers 209 on which to provision the requested instances 216 and the invoice may be transmitted to the user on the client device 206 before the requested instances 216 are provisioned to the determined server computers 209. In this embodiment, the user may then accept and/or reject invoice based on the price. For example, the user may accept the invoice by transmitting an indication of the acceptance via the one or more network pages and/or an API call. In response to receiving the acceptance, the provision service may disseminate the requested instances 216 onto the determined server computers 209. As another example, the user may reject the invoice by transmitting an indication of the rejection via the one or more network pages and/or an API call. For example, the price on the invoice may not be desirable. In one embodiment, the user may transmit another request 236 with a different duration 239 and/or a different start time 243 that may cause a reduction in the price. For instance, the different duration 239 and/or the different start time 243 may correspond to a lull in the activity of the server computers 209 thereby invoking a discount on the price.

Figure 2C:
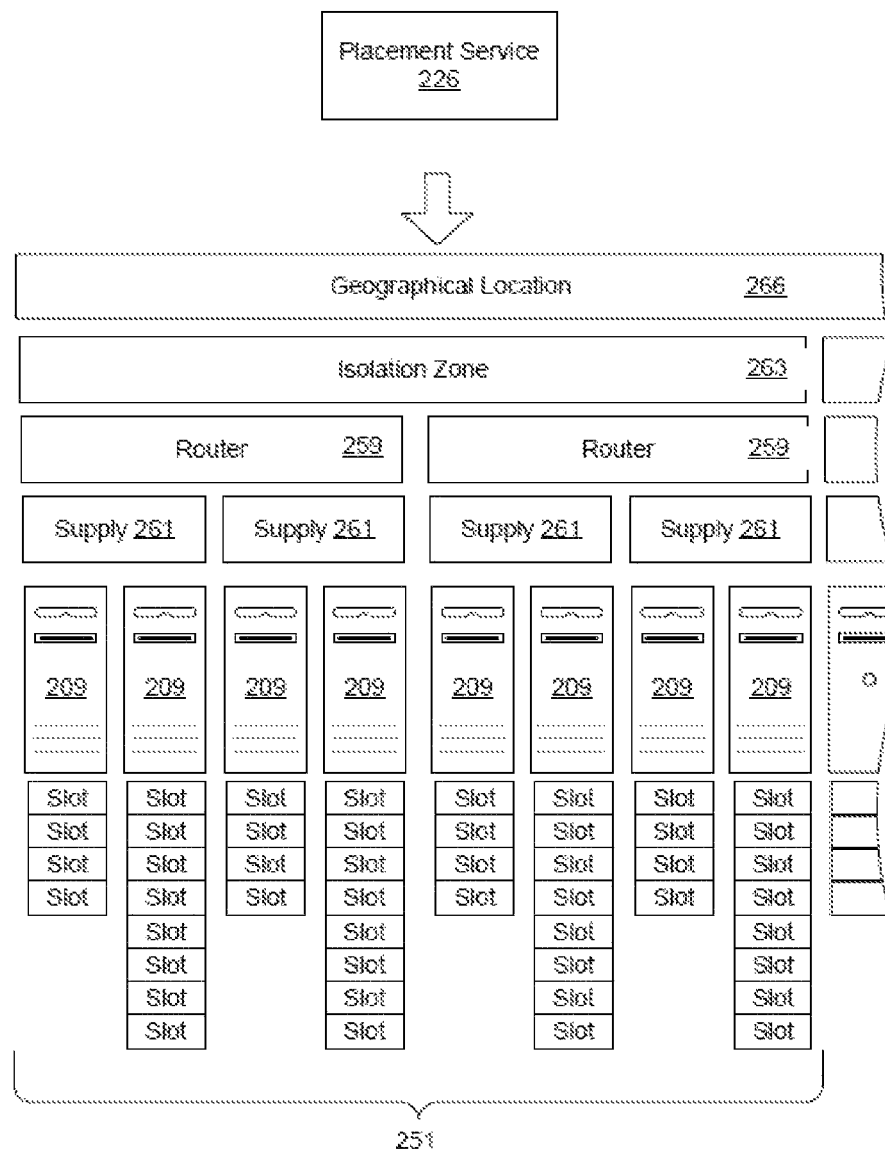
FIG. 2c illustrates components for a placement service that provisions instances on server computers.

FIG. 2c is a computing system diagram showing components of the placement service 226 disclosed herein for provisioning instantiated instances on one or more server devices. Shown are the server computers 209 in communication with the distributed computing resource system 203 (FIG. 2a). In one embodiment, the collection of server computers 209 may be viewed as a data center that includes virtual machine slots 251, physical hosts 216 (ie, server computers), power supplies 261 routers 259, isolation zones 263, and geographic locations 266. The server computers 209 may be shared by multiple virtual machine slots 251 capable of holding a guest operating system. Multiple server computers 209 may share a power supply 261 such as a power supply 261 provided on a server rack. A router 259 may service multiple server computers 209 across several power supplies 261 to route network traffic. An isolation zone 263 may service many routers 259, the isolation zone 263 being a group of computing resources that are serviced by redundancies such as backup generators. Multiple isolation zones 263 may reside at a geographical location 266, such as a data center. The placement service 226 may executed on a server device that includes a memory and processor configured with instructions to analyze user data and rank available implementation resources using determined roles and shared resources as well as detecting health and/or failure of computing resources.

Distance between resources or proximity may be measured by the degree of shared resources. This distance may be used in the ranking of resources according to availability. For example, a first instance on a server computer 209 that shares a router 259 with a second instance may be more proximate to the second instance than to a third instance only sharing an isolation zone 263. In one embodiment a distance between two slots 251 sharing a server computer 209 may be defined as a zero distance. A distance between two slots 251 on two different server computers 209 sharing a power supply 261 may be defined as a 1 distance. A distance between two slots 251 on two different server computers 209 on different power supplies 261 sharing a router 259 may be defined as a 2 distance. The distance may be further incremented for each level of unshared resource. In another embodiment, the distance may be defined in terms of unshared resources. For example, two slots 251 sharing a router 259 may have a distance of a server computer 209 and a power supply 261. Each difference in resources may be weighted differently in a distance calculation.

Figure 3:
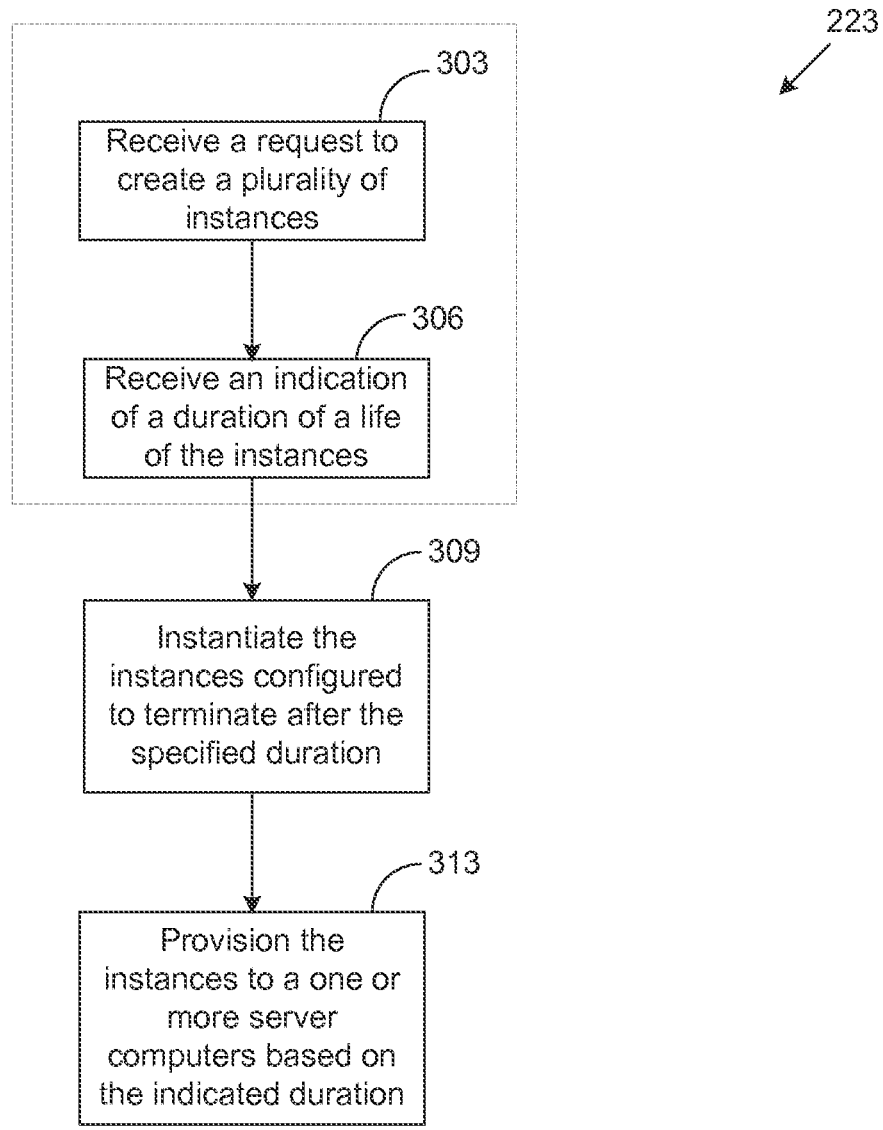
FIG. 3 is a flow chart illustrating an exemplary method for instantiating instances with a duration.

FIG. 3 is a flowchart that illustrates steps of a process to create instances of a requested number of instances 216, which may be performed by the instance service 223 described in connection with FIG. 2a and FIG. 2b, according to certain embodiments. Beginning with step 303, the instance service 223 receives a request 236 (FIG. 2a) from a user on the client device 206 (FIG. 2a) to create a plurality of instances 216. Additionally, in step 306 the instance service 223 may receive an indication of a duration 239 (FIG. 2a) of a life of the instances 216, although such information may be received separately from the request 236. As noted, the duration 239 may be indicated by a length of time and/or a time in the future at which to terminate the instances 216. In one embodiment, the instance service 223 may also receive a start time 243 (FIG. 2a) that indicates a time in the future at which to create the instances 216. Additionally, the functionality described in steps 303 and 306 may be performed simultaneously and/or in one step, as denoted by the dotted line. In step 309, the instance service 223 instantiates the instances 216. For example, the instances 216 may be configured to automatically terminate after the specified duration 239. Instantiating the instances 216 may include creating the machine images according to the preferences provided by the user and allocating an amount of hardware resources specified by the user. Then, in step 313, the instance service 223 invokes the placement service 226 to provision the instantiated instances 216 on one or more server computers 209 (FIG. 2a) based at least in part on the indicated duration, as described above.

Figure 4:
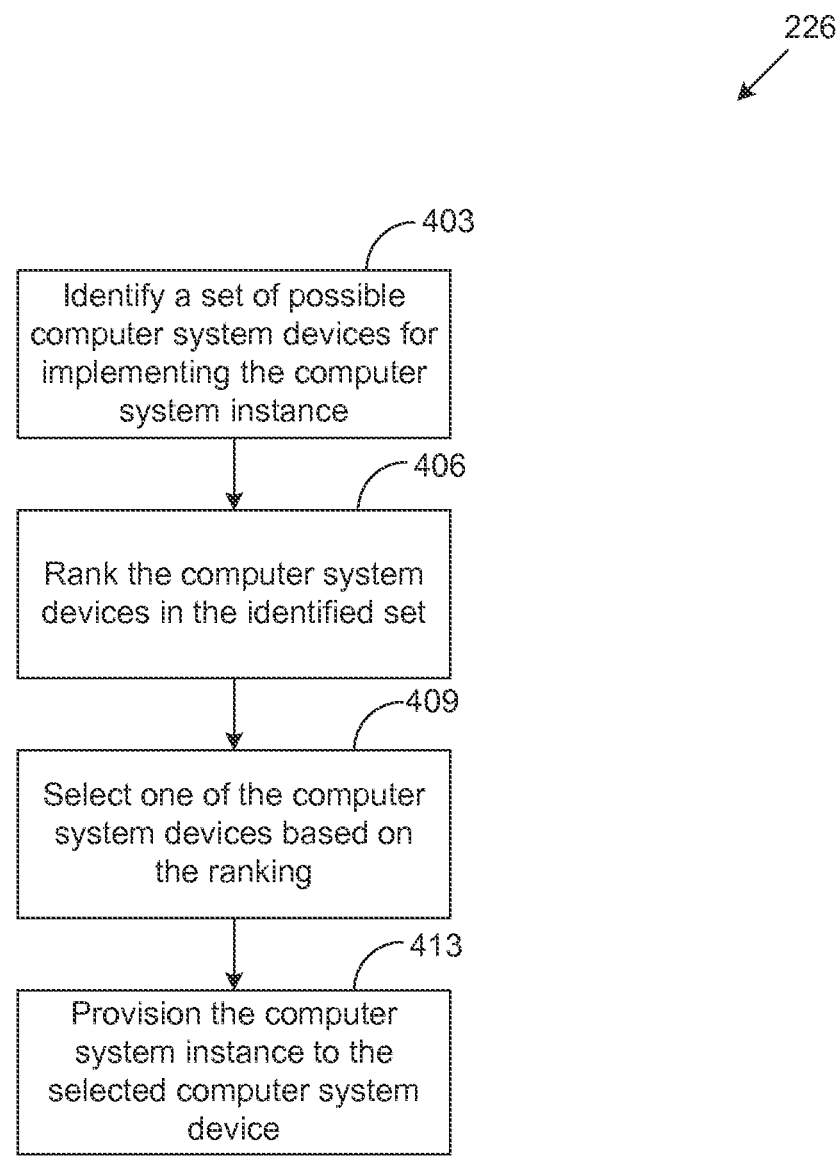
FIG. 4 is a flow chart illustrating an exemplary method for provisioning instances having a duration.

FIG. 4 is a flowchart that illustrates steps of a process to provision instances 216 having a bounded lifetime on a set of server computers 209 (FIG. 2a), which may be performed by a placement service 226 described in connection with FIG. 2a and FIG. 2b, according to certain embodiments. Beginning with step 403, the placement service 226 identifies a set of possible server computers 209 for implementing the instance 216. In one embodiment, the placement service 226 may identify the possible server computers 209 (FIG. 2a) based at least in part on a duration 239 (FIG. 2b) of the instance 216. For example, the placement service 226 may determine an available capacity 250 (FIG. 2) for each server computer 209 by identifying an amount of resources already committed to previously provisioned instances 216 on the respective server computer 209. If the available capacity 250 (FIG. 2a) of the server computer 209 is sufficient to provision the instance 216 to the server computer 209, the placement service 226 may identify the server computer 209 as a possible server computer 209 for implementing the instance 216. Additionally, the placement service 226 may also identify the possible server computers 209 based at least in part on a start time 243 (FIG. 2b) of the instance 216. For example, the placement service 226 may determine the future available capacity 250 of the server computer 209 at a time that corresponds to the start time 243. The placement service 226 may also identify the possible server computers 209 based at least in part on whether there is available capacity 250 for the span of the duration 239 of the instance 216. Then, in step 406, the placement service 226 may rank the possible server computers 209. In one embodiment, the placement service 226 may rank the server computers 209 based at least in part on the amount of available capacity 250, the software versioning, and/or other criteria as discussed above. In step 409, the placement service 226 may then select one of the server computers 209 based at least in part on the ranking and provision the instance 216 for implementation by the selected server computer 209.

Figure 5:
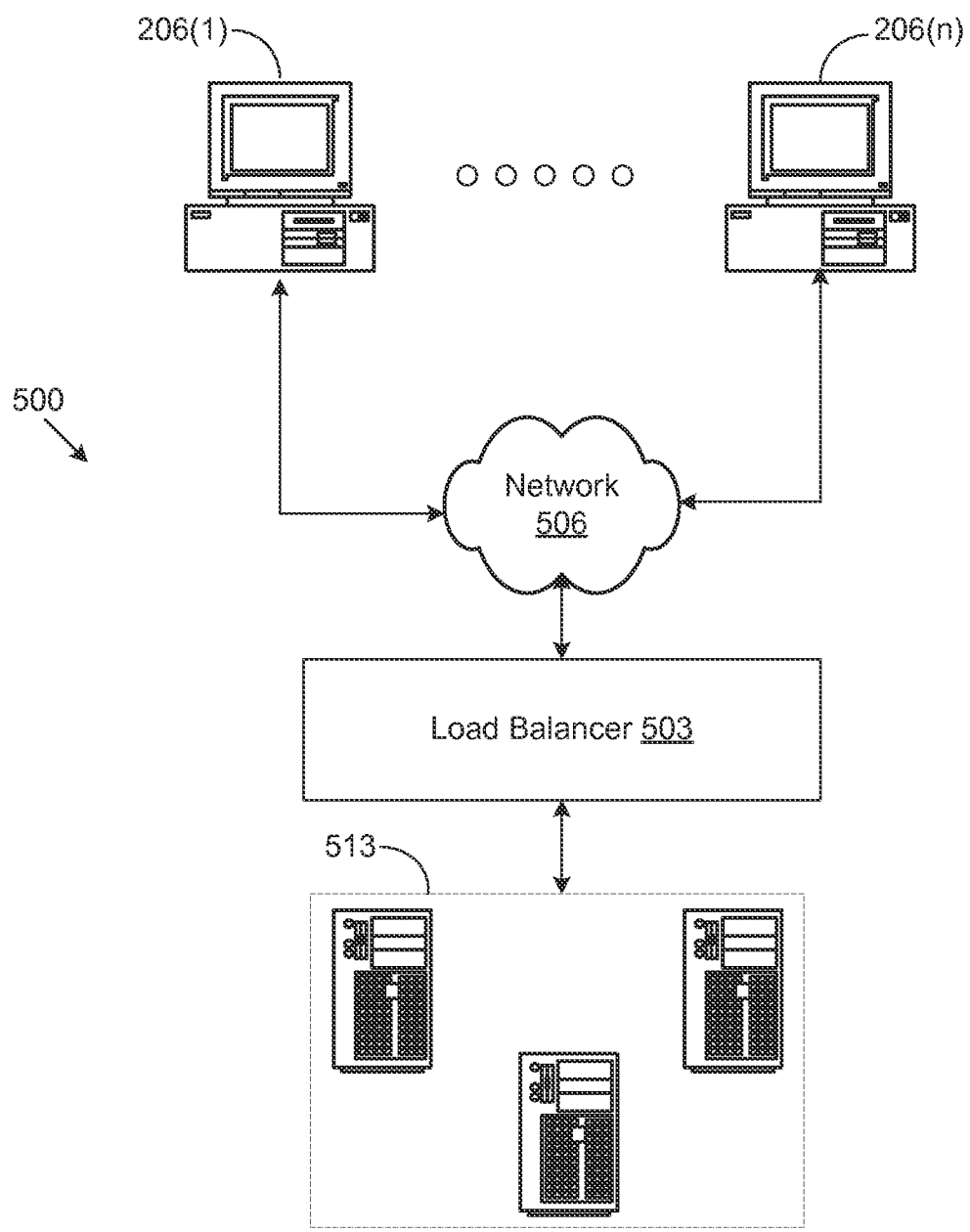
FIG. 5 illustrates components for load balancing requests to access components in a load balanced network.

FIG. 5 shows an environment 500 including a load balanced network 506 that includes one or more client devices 206 that are each individually in data communication with a load balancer 503 over a network 509. The load balancer 503, in an embodiment, is a component of the distributed computing resource system 203 as described in connection to FIG. 2*a*, and may be in data communication a collection of server computers 513. The collection of server computers 513 may individually or in combination execute and/or implement a variety of applications and/or services, the details of which are not relevant herein. For example, the collection of server computers 513 might provide a Web site or electronic marketplace, for example, or could in some embodiments include an enterprise application, a company's electronic presence, a database application, and/or the like. Additionally, the collection of server computers 513 may correspond to the server computers 209 (FIG. 2*a* and FIG. 2*b*), as described above. In one embodiment, the load balancer 503 may be one or more systems, devices, and/or components for processing requests from users of client devices 206 to access components of the load balanced network 506.

The load balancer 503 may receive the requests from the users and appropriately forwards the incoming requests. For example, the requests transmitted from the client devices 206 are each associated with a destination, such as, for example, one of the server computers of the collection of service computers 513. In one embodiment, the load balancer 503 receives the requests for accessing the components of the load balanced network 506, determines a server computer that can respond to the request, and then forwards the request to the determined server computer for processing. In another embodiment, the load balancer 503 may respond to the requesting client device with information related to the determined server computer. The client device may then directly communicate with the determined server computer based on the information. For example, the information may include a unique address of the determined server computer. In one embodiment, the load balancer 503 may determine the server computer by, identifying a server computer associated with a previous request over the same connection with the requesting client. If a previous request has not been made over the connection, then, in another embodiment, the load balancer 503 determines a server computer based at least in part on a current distribution of load across the servers being served by the load balance 503.

In particular, the load balancer 503, in one embodiment, determines whether the received request corresponds to a existing connection between the source of the request (i.e., the client device 206) and the load balancer 503. Responsive to the determination that the received request corresponds to an existing connection, the load balancer 503 may simply forward the request to the server computer associated with the existing connection. However, if the received request does not correspond to any existing connections, the load balancer 503 determines an available server computer to process the request and forwards the request to the available server computer. To this end, the load balancer 503 determines whether one or more server computers (for example, server computers 209) are implementing instances 216 having a bounded lifetime. Responsive to this determination, the load balancer 503 determines whether those server computers are scheduled to shut down, restart, and/or otherwise become unavailable within a threshold amount of time. In one embodiment, the load balancer 503 may invoke the maintenance service 233 (FIG. 2) to ascertain whether the server computers are scheduled to shutdown within the threshold amount of time. For example, the maintenance service 233 may monitor the lifetimes 256 (FIG. 2*b*) of the instances 216 for scheduling a shut down of the server computer 209, as described above. If the load balancer 503 determines that the server computer will remain active and/or available for beyond the threshold amount of time, then the load balancer 503 forwards the request to the server computer. If the load balancer 503 determines that a server computer will not be active and/or available within the threshold amount of time, then the load balancer 503 may not forward the request to the respective server computer. In this case, the load balancer 503 proceeds to another server computer to determine whether the server computer is available for a threshold amount of time. Accordingly, the load balancer 503 prevents requests from client devices 206 from being forwarded to computer server computers scheduled to become unavailable within a threshold amount of time.

Figure 6A:
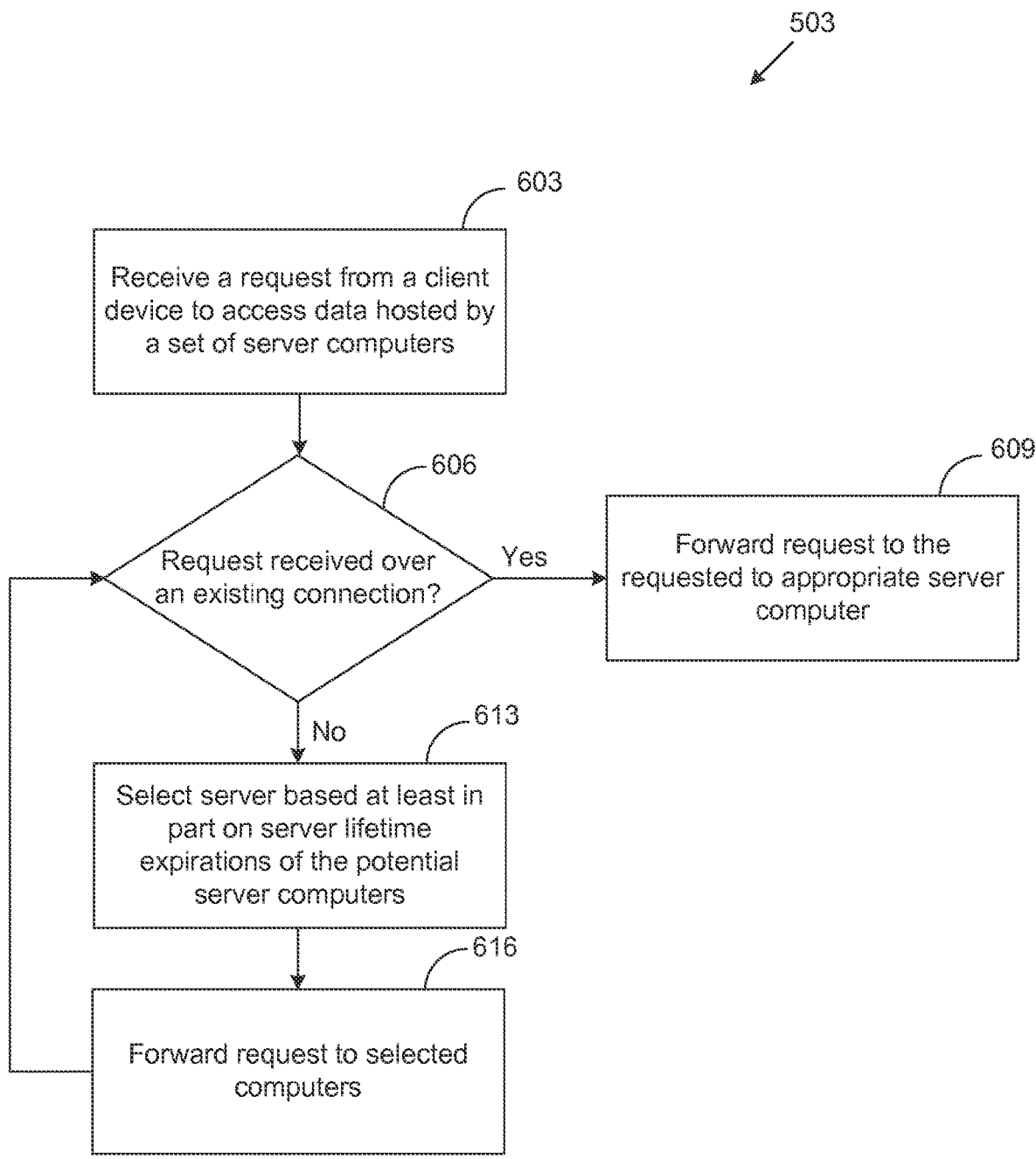
FIG. 6a is a flow chart illustrating an exemplary method for load balancing requests to access components in the load balanced network.

FIG. 6*a* is a flowchart that illustrates steps of one approach to load balance a load balanced network, which may be performed by the load balancer 503 described in connection with FIG. 5, according to certain embodiments. Beginning with step 603, the load balancer 503 receives, from one of a many client devices, a request to access data hosted by a destination, such as, a component of the load balanced network 506 (FIG. 5), for example, a server computer 209 (FIG. 2), and/or another server computer of the collection of server computers 513. Then, in step 606, the load balancer 503 determines whether the request is received over an existing connection between the load balancer 503 and the client (such as a connection over which at least one previous request has been received), or recently formed connection (such as a connection over which the received request is the first request received). For example, the load balancer 503 may identify destinations associated with existing connections between the client device 206 (FIG. 2*a*) transmitting the request and the load balancer 503 and determine whether the destination associated with the request corresponds with any of the destinations associated with the existing connections. Responsive to the determination that the destination associated with the request corresponds to a previously existing connection, the load balancer 503 advances to step 609 and forwards the request to the destination, as can be appreciated. The load balancer 503 may, for example, forward the request to the server computer that processed the last request received over the existing connection. It should be noted that, in some embodiments, the load balancer 503 may forward requests to server computers using a selection algorithm that does not take into account past forwarding history. For example, if the server computers serve a static web page that provides the same content regardless of what the client as done recently, the load balancer 503 may forward the request to a server computer without regard to which server computer received a previous request.

However, if the destination associated with the request does not correspond to any of the previously existing connections, in one embodiment, the load balancer 503 advances to step 613 and selects a server computer 209 based at least in part on the expiration of each of the server computers and/or the expiration of any of the server computers that have an expiration, if not all server computers have an expiration. For example, the load balancer 503 determines whether the server computer is scheduled to become unavailable. As discussed above, the server computer 209 (i.e., a server computer of the collection of server computers 513) may be scheduled to be shut down and/or restarted within a threshold amount of time based on the lifetimes 256 (FIG. 2) of the instances 216 being implemented by the server computer 209. In one embodiment, the load balancer 503 may invoke the maintenance service 233 (FIG. 2) to determine whether the server computer is scheduled to become unavailable within the threshold amount of time. If the load balancer 503 determines that the server computer is not scheduled to become unavailable, then the load balancer selects server computer and in step 616, forwards the request from the client device to the selected server computer.

Figure 6B:
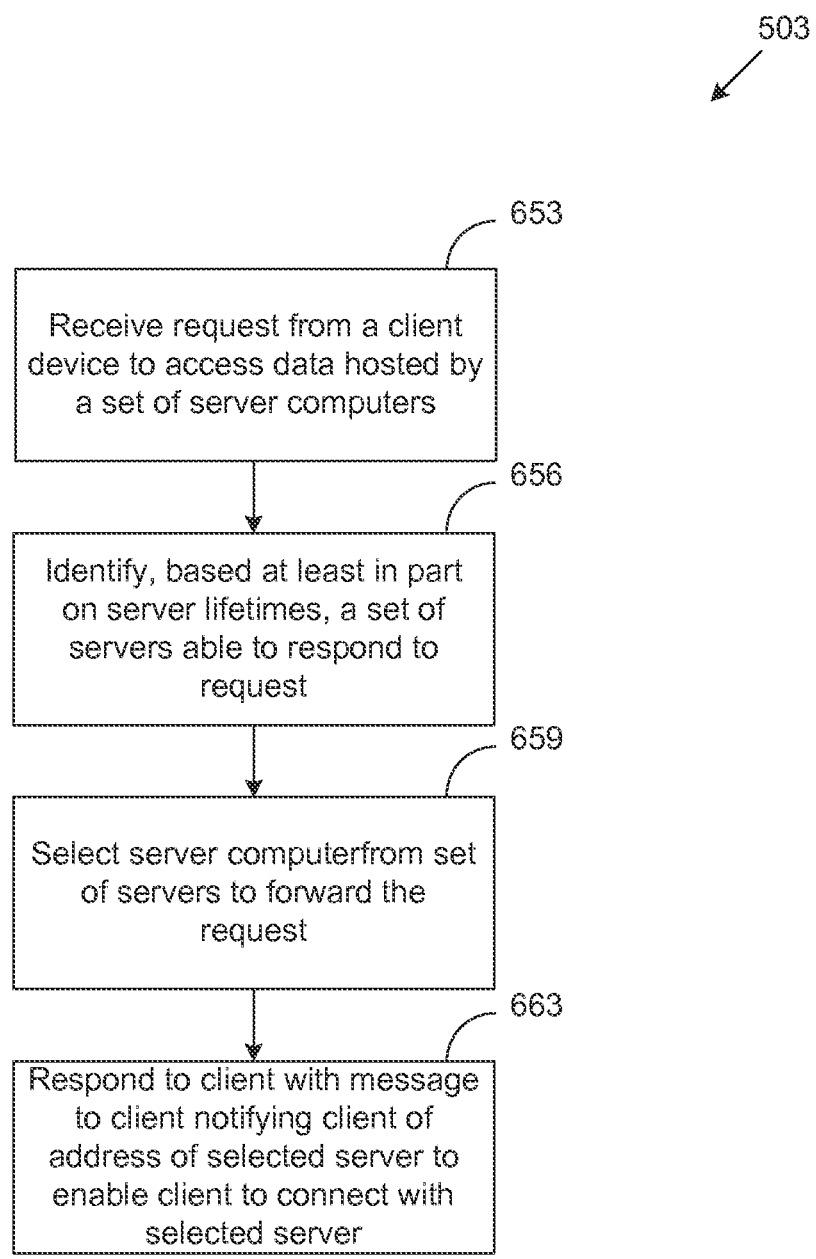
FIG. 6b is a flow chart illustrating another exemplary method for load balancing requests to access components in the load balanced network.

FIG. 6*b* is a flowchart that illustrates steps of another approach to load balance a load balanced network, which may be performed by the load balancer 503 described in connection with FIG. 5, according to certain embodiments. Beginning with step 653, the load balancer 503 receives, from one of a many client devices, a request to access a data hosted by a destination, such as a component of the load balanced network 506 (FIG. 5), for example, a server computer 209 (FIG. 2) and/or another server computer of the collection of server computers 513 (FIG. 5). Then, in step 656, the load balancer 503 identifies a set of server computer able to respond to the request based at least in part on the expiration of each of the server computers. For example, the load balancer 503 determines whether a server computer is scheduled to be come unavailable. As discussed above, the server computer 209 (i.e., a server computer of the collection of server computers 513) may be scheduled to be shut down and/or restarted within a threshold amount of time based on the lifetimes 256 (FIG. 2*b*) of the instances 216 being implemented by the server computer 209. In one embodiment, the load balancer 503 may invoke the maintenance service 233 (FIG. 2*a*) to determine whether the server computer is scheduled to become unavailable within the threshold amount of time. Then, in step 659, the load balancer 503 selects one of the servers from the identified set of servers able to respond to the request and forwards the request from the client device to the selected server. In step 663, the load balancer 503 may respond to the client device with a message with a notification indicating an address (for example, an Internet Protocol address) of the selected server. In one embodiment, the load balancer 503 may function as a relay point that forwards messages between the client device and the selected server for all subsequent communication between the client device and the selected server. Additionally, the load balancer 503 may select a new server computer for processing each new message received from the client device. In another embodiment, the client device and the selected server may communicate directly with each other upon being selected by the load balancer 503.

Figure 7:
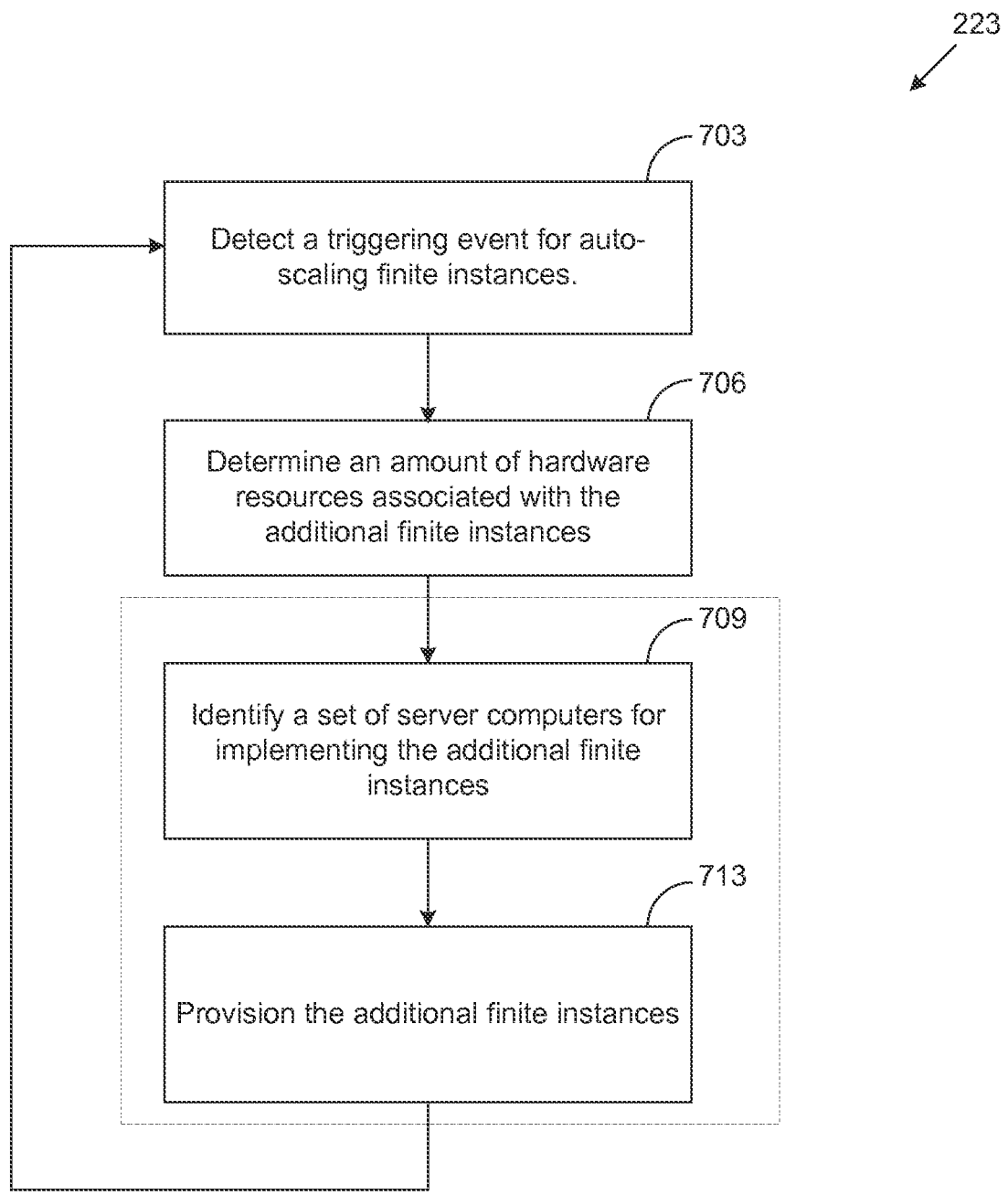
FIG. 7 is a flow chart illustrating an exemplary method for scaling a set instances

FIG. 7 is a flowchart that illustrates steps of a process to scale instances 216, which may be performed by the scaling service 229 described in connection with FIG. 2*a*, according to certain embodiments. Beginning with step 703, the scaling service 229 detects a triggering event for scaling finite instances 216. For example, the triggering event may be expanding the number of finite instances 216. In one embodiment, the triggering events may be determined by the customer, as discussed above. Then, in step 706, the scaling service 229 determines an amount of hardware resources associated with the additional finite instance 216. For example, the amount of hardware resources may be provided by the customer, may be a standard amount, may correspond to the previously provisioned instances 216, and/or some other amount. In step 709, the scaling service 229 identifies a set of server computers 209 (FIG. 2*a*) for implementing the additional finite instances 216. Then, in step 713, the scaling service 229 provisions the additional instances 216 on the identified set of server computers 209. In one embodiment, steps 709 and 713 may be performed simultaneously and/or as one step, as indicated by the dotted line. For example, the scaling service 229 may invoke the placement service 226 to perform these steps. The scaling service 229 may then return to step 703 to perform additional scaling activities upon detection of a triggering event.

Some or all of the process described in FIGS. 3, 4, 6*a*, 6*b* and 7 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, at an instance service of a distributed computing resource system that monitors and terminates computer system instances, a request to launch a first set of computer system instances, the request comprising a start time and a first expiration time for the first set of computer system instances;

determining one or more server computers within a service provider environment to use to execute the first set of computer system instances based at least in part on the start time and the first expiration time;

ranking, by a placement service of the distributed computing resource system based at least in part on information included in the request, the one or more server computers based at least in part on an amount of available capacity of a computing resource of the one or more server computers;

generating a determination, based at least in part on one or both of a second start time and a second expiration time associated with a second set of computer system instances, that the one or more server computers will have sufficient capacity to execute the first set of computer system instances at the start time;

provisioning the first set of computer system instances on the one or more server computers based at least in part on the ranking, the determination, and the start time;

causing a scaling service of the distributed computing resource system to perform a scaling operation by at least:
obtaining a set of conditions for scaling the first set of computer system instances; and
scaling the first set of computer system instances in response to detecting fulfillment of the set of conditions;

determining, based at least in part on the first expiration time, to terminate the first set of computer system instances; and terminating the first set of computer system instances by at least transmitting, by the instance service, a signal to a set of instance managers executed by the one or more server computers executing the first set of computer system instances, the one or more servers, and the distributed computing resource system included in a computing resource service provider environment.

2. The computer-implemented method of claim 1, wherein provisioning the first set of computer system instances comprises provisioning the first set of computer system instances to the one or more server computers based at least in part on available resources of the one or more server computers and the first expiration time associated with the first set of computer system instances.

3. The computer-implemented method of claim 2, further comprising provisioning the first set of computer system instances to the one or more server computers based at least in part on the first expiration time associated with the first set of computer system instances and a server computer maintenance schedule.

4. The computer-implemented method of claim 1, wherein:
detecting the fulfillment of the set of conditions further comprises determining that one or more conditions for changing a size of the second set of computer system instances that includes the first set of computer system instances has been fulfilled; and
scaling the first set of computer system instances further comprises provisioning additional computer system instances on the one or more server computers based at least in part on the first expiration time associated with a plurality of computer system instances previously provisioned on the one or more server computers.

5. The computer-implemented method of claim 4, wherein the one or more conditions for changing the size of the second set of computer system instances further comprise a threshold that, as a result of being exceeded, causes one or more scaling processes to be triggered.

6. The computer-implemented method of claim 5, wherein the first expiration time is determined based at least part on one of a cost associated with one or more of:
the first set of computer system instances,
available resources of the one or more server computers, or
an amount of resources associated with the first set of computer system instances.

7. The computer-implemented method of claim 1, wherein the second set of computer system instances have a different start time than the start time, the different start time being earlier than the start time.

8. The computer-implemented method of claim 1, wherein the first set of computer system instances includes a virtual computer system instance.

9. The computer-implemented method of claim 1, further comprising provisioning the first set of computer system instances to the one or more server computers based at least in part on a ranking of resources according to availability.

10. The computer-implemented method of claim 1, wherein the ranking of the one or more server computers is based at least in part on the amount of available capacity of the computing resource and a version of software executed by the computing resource.

11. A computer-implemented method comprising:
receiving, in connection with a request to create a first computer system instance, information that indicates a start time and an expiration time for the first computer system instance, the request received at an instance service of a distributed computing resource system, where services of the distributed computing resource system interact with one or more servers of a computing resource service provider environment;

as a result of detecting a fulfillment of a set of specified conditions, scaling, scaling service of the distributed computing resource system, a set of computer system instances based at least in part on a ranking of a set of server computers executing the set of computer system instances, the ranking of the set of server computers generated by a placement service of the distributed computing resource system and based at least in part on information included in the request and an amount of available capacity of a computing resource of the set of server computers;

determining, based at least in part on an expiration time of a second computer system instance, that the computing resource of the set of server computers will have enough capacity to scale the set of server computers for the first computer system instance; and taking one or more actions that cause the first computer system instance to be created based on the start time and then be terminated based on a system time and the expiration time for the first computer system instance, where the instance service causes the first computer system instance to be created and terminated by at least transmitting one or more requests to an instance manager executed by the computing resource.

12. The computer-implemented method of claim 11, wherein the one or more actions that cause the first computer system instance to be created include selecting, based at least in part on the expiration time for the first computer system instance, a server computer to host the first computer system instance.

13. The computer-implemented method of claim 11, further comprising generating an accounting record used to generate an invoice for a customer associated with the request.

14. The computer-implemented method of claim 11, wherein the one or more actions that cause the first computer system instance to be created include provisioning, based at least in part on the expiration time for the first computer system instance and a projected availability of a set of server computers, the first computer system instance to the set of server computers.

15. The computer-implemented method of claim 12, wherein the second computer system instance has a different start time than the start time, the different start time being earlier than the start time.

16. The computer-implemented method of claim 11, wherein:
receiving the request to create the first computer system instance comprises receiving the request to create a plurality of computer system instances, wherein the start time indicates a time for creating at least a subset of the plurality of computer system instances; and
taking the one or more actions comprises taking one or more actions that cause at least the subset of the plurality of computer system instances to be created at the start time.

17. The computer-implemented method of claim 16, wherein taking the one or more actions further comprises selecting, based at least in part on an indicated duration or the start time, a set of server computers to host the plurality of computer system instances.

18. The computer-implemented method of claim 16, wherein taking the one or more actions further comprises pre-caching a machine image used to instantiate the plurality of computer system instances.

19. The computer-implemented method of claim 11, wherein the first computer system instance is a virtual computer system instance.

20. The computer-implemented method of claim 11, wherein ranking of the set of server computers is based at least in part on one or more of: a role associated with members of the set of server computers, an amount of shared resources between the members of the set of server computers, a health associated with the members of the set of server computers, and a failure state of the members of the set of server computers.

* * * * *